Patented Mar. 14, 1944

2,343,898

UNITED STATES PATENT OFFICE 2,343,898

FILM FORMING COMPOSITION, METHOD, AND ARTICLE

Ira L. Griffin, Dave E. Truax, and Norman H. Nuttall, Charlotte, N. C., assignors to Stein, Hall and Company, Inc., New York, N. Y., a corporation of New York No Drawing. Application February 11, 1942, Serial No. 430,412

37 Claims. (Cl. 117—161)

This invention relates to film forming compositions and to a method of increasing the permanency and the resistance to water of various types of materials by the treatment of said materials with the compositions of this invention.

The expression "film forming compositions" as employed herein is intended to cover generically a rather wide variety of compositions useful in several different industries with some modification, for example, compositions useful in the textile industry, the paper industry, the leather industry, as adhesives, as insulating materials and for many other purposes where resistance to water is a factor and increased resistance to water is desired. The compositions of the invention may be applied in sizing, coating, impregnating, finishing, dyeing, printing and in various other types of treatments applicable to textiles, paper and other types of materials.

The present application is a continuation-in-part of our co-pending applications Serial No. 378,564, filed February 12, 1941, in which the claims are directed more specifically toward textile printing, and Serial No. 386,626, filed April 3, 1941, in which the claims are directed more specifically toward increasing the permanency of the finish of textile materials and toward sizing and finishing compositions.

As is well known, many methods and different types of compositions have been proposed for increasing the water resistance, permanency of finish and other properties where water resistance is a factor, in various types of materials. Synthetic resins have been widely used in the treatment of textiles and have also been suggested for use in the treatment of a wide variety of other materials. Some of these proposed methods and compositions have been successful, others moderately successful and still others have left much to be desired. Among some of the disadvantages of the use of resins and of the use of other methods for treating various types of materials in order to impart water resistance thereto are the relatively high cost of the treating agents, fire hazards, odors and high temperatures required in drying the various types of articles after they have been treated. In a number of instances, the scarcity of the treating agents for the results obtained have not justified the treatment commercially.

One of the objects of the present invention is to provide new and improved film forming compositions of from readily available raw materials capable of imparting water resistance or greater permanency to various types of materials treated therewith.

Another object of the invention is to provide new and improved film forming compositions of the character described made from carbohydrate materials of the type hydrolyzable by acids to simpler molecular compounds, including, for example, such abundantly available materials as starches and starch derivatives, or degradation products.

Still another object of the invention is to provide new and improved compositions of the character described which give improved results in imparting greater permanency and resistance to water when applied to many different types of materials.

More specific objects of the invention are the provision of new and improved coating compositions, sizing compositions, impregnating compositions, finishing compositions and adhesive compositions.

An additional object of the invention is to provide a new and improved method for the treatment of various types of materials, including particularly fibrous materials, which imparts greater permanency to films on the fiber.

Other objects will appear as the description proceeds.

In accomplishing these objects in accordance with this invention, new and improved film forming compositions are prepared by bringing together a water dispersible film forming carbohydrate material hydrolyzable by acids to simpler molecular compounds, as, for example, starches or starch degradation products, natural gums and related materials, and a fixing agent in the form of an antimony compound reactive with said carbohydrate material to render said carbohydrate material water insoluble upon dehydration. For practical purposes it has been found that the pH of the composition or the pH conditions under which the reaction is to take place should be less than 10 and should preferably be less than 7. The minimum pH will be controlled largely by the effect of acidic conditions upon the material being treated or which is to be treated and in most instances should preferably be greater than 2.5, although in some instances it may be possible to use a lower pH. The compositions prepared in accordance with the invention may be, for example, coating compositions for coating paper, cloth, wood, leather, metals and other materials where water resistant films or greater permanency is desired.

The film forming compositions of the invention may be applied to various types of objects or articles, or may be formed in situ thereon in a number of ways of which the following may be mentioned.

The fixing agent, for example, potassium pyroantimonate, may be mixed directly with the carbohydrate substance, as, for example, an amylaceous substance, a natural gum, a polyvinyl alcohol or a blend of two or more of such carbohydrate substances, to form a dry blend which may be dispersed in water by cooking. Alternatively, the fixing agent and the carbohydrate material may be mixed directly together in the water. The dispersion thus obtained by cooking may then be applied as a coating, sizing, finishing, impregnating or adhesive composition to any one of a number of different types of fibrous material, including textile fibers or fabrics, paper, insulating materials and other types of materials which will be apparent to those skilled in the art. The compositions thus prepared, or their individual components separately, may also be applied to form films on metals, wood and other materials of construction where water resistance or greater permanency is desired and for many specific applications, including the treatment of walls made from plaster, plaster board, or other well known materials, floor coverings of linoleum, and the like, and for a wide variety of other purposes. In some instances it has been found that there is a tendency for the composition to gel or become rubbery when the components thereof are cooked together, and to avoid this, the cooking must be done carefully.

The concentration of starchy material influences the amount of jelling. Likewise, the temperature and time of cooking influence the extent of the jelling. For this reason the cooking should preferably be carried out under controlled conditions. One preferred method of operation is to bring the temperature of the dispersion containing a starch, water and the fixing agent, for example, potassium pyroantimonate, to a temperature of about 170° F. to 175° F. and shut off the heat as soon as this temperature is reached. If the heating is prolonged at this temperature, or a higher temperature, the paste is more likely to gel. Jelling is more pronounced in the case of thick starches. For this reason, it is sometimes desirable to employ a mixture of starches or starch degeneration products. Thus, an undegenerated starch may be mixed with a modified or degenerated starch.

Corn starch or tapioca flour modified by enzyme conversion to a definite viscosity can be treated with an antimony compound such as potassium pyroantimonate after the conversion is completed and used for forming films which, upon drying to a low moisture content, will develop water resistance.

In some instances, a gel is obtained when the binding agent is cooked with the fixing agent in the manner above described, but these gels are for the most part "thixotropic," that is to say, the gels are broken by mechanical action such as mixing or stirring.

In certain instances the antimony compound has the advantage of producing an increased body or viscosity of the dispersion and thereby reduces the amount of the carbohydrate necessary to obtain the desired result. For example, potassium pyroantimonate has this effect on amylaceous substances. Thus, the presence of potassium pyroantimonate may make it possible to reduce the amount of amylaceous substances to, say, 5 to 8 ounces per gallon instead of 12 to 16 ounces per gallon if no potassium pyroantimonate were used. Additional amounts of potassium pyroantimonate may always be added later.

In practicing the invention, the carbohydrate material such as an amylaceous material, a natural gum, a polyvinyl alcohol, a blend of the amylaceous material and the polyvinyl alcohol, or some other combination thereof, may be applied to the article or object which is to be treated in a separate phase from the antimony compound. Thus, the antimony compound may be applied to the textile fiber or fabric either before or after the carbohydrate film forming material. The reaction between the two components then takes place in situ, that is to say, either on or within the article, material or object which is being treated, and hence, the difficulty often encountered due to premature jelling or setting up is avoided.

The invention is particularly valuable in finishing treatments for textile fabrics. The expression "finishing treatments" is employed to describe treatments which are given to the fabric in the last or finishing stage of manufacture. These treatments may be applied to either undyed or dyed materials.

The invention may also be applied to the sizing of textile fibers, for example, by warp sizing or by skein sizing, particularly where it is desired to produce a sized material which will resist the mechanical action of the loom and from which it is not necessary to remove the sizing after weaving and before dyeing. The term "sizing" as used in the trade normally refers to the treatment of the yarn or fiber prior to weaving.

The invention may also be employed for weighting textile materials to replace losses in weight incurred through soap scouring, kier boiling, mercerizing and bleaching prior to dyeing or printing. The weighting operation is normally applied to the cloth.

The invention is particularly important for imparting laundry resistance to cloth or other materials which are subjected to laundering operations.

The practice of the invention when applied to previously dyed materials has substantial advantages in that the reaction product formed by the reaction between the fixing agent and the binding agent tends to fix the dye and produce a fabric or cloth in which the color is faster than would otherwise be the case.

The invention is of further importance particularly in the printing of dyes on textile fabrics because in the printing operation special problems are involved and it is often difficult to obtain prints of satisfactory brilliance, clarity and fastness except with the most expensive of dyes. The present invention makes possible the employment of cheaper dyes and at the same time is relatively less expensive than methods heretofore proposed to accomplish this object.

In the practice of the invention the film forming compositions herein described may be employed very effectively for a wide variety of purposes in the paper mill, including tub sizing, calendering and coating.

The invention will be further illustrated but is not limited by the following examples in which the quantities are stated in parts by weight unless otherwise indicated:

*Example I*

A finishing composition was prepared by cooking 8 ounces of modified starch with .04 ounce of potassium pyroantimonate in one gallon of water to a temperature of 170° F. to 175° F. and shutting off the heat as soon as this temperature was reached. The resultant finishing composition was then applied directly to textile materials, including cotton cloth and other textile fabrics at temperatures within the range varying from about room temperature (75° F.) to about 175° F. The finishing treatment was applied to the fabric by immersion, dipping, coating and other similar methods. The fabric was then dried at a temperature from about 240° F. to 300° F. to a moisture content of preferably 2% or less. An excellent permanent finish was obtained.

*Example II*

A finishing composition was prepared by cooking 16 ounces of a modified starch known as thin boiling #40 with .08 ounce of potassium pyroantimonate in a gallon of water to a temperature of 170° F. to 175° F. and then shutting off the heat.

Cotton cloth and other textile fabrics were finished with this composition by giving them a finishing treatment at temperatures from about room temperature to 175° F. by immersion, dipping and other known methods. The fabric was then dried to a moisture content of preferably 2% or less. An excellent finish was obtained.

*Example III*

A blend was prepared by mixing together 81% of a water dispersible starch product, 15% of polyvinyl alcohol (Du Pont 349) and 4% of potassium pyroantimonate. For use in finishing fabrics, this blend is mixed with water in the proportion of about 1 to 1½ lbs. per gallon and the mixture is heated to 180° F. It is then applied as a finishing composition in the usual manner and when the fabric is dried it exhibits considerable water resistance and shrinkage control.

*Example IV*

Another formula which is particularly suitable for finishing compositions and which is both water resistant and effective in minimzing shrinkage is prepared by blending the following ingredients:

| | Per cent |
|---|---|
| Starch product | 87.3 |
| Polyvinyl alcohol 349 | 10 |
| Potassium pyroantimonate | 2.7 |

The bland is mixed with water and heated in the manner described in Example III. It is then applied as a finishing composition according to well known and established practice.

*Example V*

The following polyvinyl alcohol starch combination in conjunction with potassium pyroantimonate has given particularly good results in printing, especially for crinkle work:

| | Per cent |
|---|---|
| Starch product | 80.64 |
| Potassium pyroantimonate | 3.23 |
| Polyvinyl alcohol 349 | 16.13 |

A blend was prepared by mixing the foregoing ingredients for printing as follows: 1½ lbs. of this blend and 3 lbs. of British gum are mixed with cold water sufficient to make one gallon and cooked to 190° F. to 200° F. and kept at this temperature for 25 to 30 minutes. The resultant dispersion is then cooled to room temperature. This product forms a thickener which is mixed with pigments and used for printing.

*Example VI*

The present example will illustrate the application of the invention to the treatment of paper in order to enhance various properties thereof, particularly the water resistance. One of the objects of the invention is to enhance the water resistance of paper without destroying other desirable properties. The extent to which the water resistance may be increased may be varied in a manner which will be more fully understood from the description hereinafter given. The compositions of the present invention may be applied in any of the well known general applications in paper mill usage, including tubbing, calendering and coating. A typical example of a composition suitable for tubbing and calendering is the following blend:

| | Per cent |
|---|---|
| Starch product | 96.0 |
| Potassium pyroantimonate | 4.0 |

This product is used by mixing it with water in the concentration of about 1 lb. to the gallon, heating to 180° F. for about 15 minutes and then diluting to the desired concentration, which is usually within the range from about 8% to about 12% for tubbing, and from about 4% to about 10% for calendering. In order to develop the maximum water resistance, it is preferable to dry the paper to a moisture content of below 3%, although it will be understood that the invention is not limited to this moisture content as water resistance is a relative property and in some instances it may be desirable to develop the water resistance only slightly.

The starch product employed may be any of the usual starch products employed in tubbing or calendering operations. The amount of water resistance developed may be decreased by decreasing the percentage of potassium pyroantimonate and likewise may be increased somewhat by increasing the percentage of potassium pyroantimonate, although it will be understood that an increase in percentage beyond a certain point has no added effect. A percentage of 5% potassium pyroantimonate has given excellent results and higher percentages may be used.

*Example VII*

The present example is given to illustrate the application of the invention to the preparation of coated papers.

A corn starch product, herein referred to as a white corn British gum, was mixed with potassium pyroantimonate in proportions of 48.5 parts of white corn British gum to 1.5 parts by weight of potassium pyroantimonate. The resultant dry blend was made up into a slurry with 50 parts of cold water, and 150 parts of boiling water were then added, causing the temperature of the mixture to reach about 150° F. The mixture was then heated to 165° F. to completely open the starch. One hundred eighty-eight (188) parts of the prepared mixture were weighed out and thoroughly mixed with 235 parts of a prepared coating clay made according to the following formula:

| | Parts |
|---|---|
| HT clay | 1500 |
| Water | 825 |

The clay was agitated 1 hour and then 4 parts tetrasodium pyrophosphate dissolved in 25 parts water were added, and the mixture agitated over a period of a half hour.

After the clay had been added to the prepared starch mixture in the manner previously described, 120 parts of water were mixed thoroughly. The mix was then screened through a hundred mesh screen. The pH of the mixture was determined on a Coleman pH meter and was approximately 6.6. The mixture was then applied to paper with a coating machine in a customary manner to give coatweights from about 11 to 15 lbs. per ream. The paper was allowed to stand and dry over night and was thereafter heated to a temperature of 110° C. to 120° C. for a half hour. A wax test was taken both before and after heating and the water resistance was determined by a rubbing test.

The results indicated that the wax test was about 6 on the unheated paper and about 6½ on the heated paper. The water resistance was good.

In the foregoing example the starch to clay ratio was approximately 25% by weight and the percentage of solids in the coating composition was approximately 34%. The viscosity of the coating composition was such that 170 cc. per minute were discharged from a special funnel at 80° F., the funnel being calibrated to discharge 300 cc. of water per minute. In each instance the level in the funnel was maintained at 100 cc.

It will be understood that other types of starch products may be employed, including enzyme modified starches and chlorinated starches.

Example VIII

The present example is given to illustrate the application of the invention in the preparation of adhesives.

A typical illustration of the preparation of an adhesive in accordance with the invention is as follows:

A dry blend was prepared by mixing together 95% of a modified starch product such as a chlorinated or oxidized starch and 5% of potassium pyroantimonate. This dry mix was treated with water in the proportion of about 1 part of dry mix to 2 parts of water, and the mixture heated to 160° F. The prepared glue was then used as an adhesive for paper surfaces, which, upon heating, developed considerable water resistance.

It will be understood that in a similar manner adhesives may be prepared for a wide variety of adhesive applications or bonding operations where a water resistant adhesive joint is desired, for example, in laminating paper to paper, paper to fabric, and other laminating operations.

In practicing the invention it is preferable to employ a starch or a starch degeneration product as the film forming base. By a starch degeneration product is meant a derivative of starch such as may be obtained by the various processes of making thin boiling and so-called modified starches and dextrines. In general, especially good results have been obtained with specially modified starches. If desired, mixtures of undegenerated and degenerated starches may be used. Starch degeneration products of a predominantly starchy nature are preferable to the more highly dextrinized starches, because after a certain degree of disorganization of the starch, it usually requires a much larger percentage of the fixing agent, e. g., a water soluble pyroantimonate, to bring about fixation, water insolubilization, or a hydrophobic state of the starch.

Among the suitable starchy materials may be mentioned wheat, rye, barley, oat, rice, corn and potato starches, sago and cassava flours and colloidal modifications thereof, and other starches and flours and derivatives thereof. Among the natural gums which may be employed may be mentioned particularly locust bean gum, gum tragacanth and other water dispersible, film forming natural gums. Of the water dispersible synthetic film forming substances, special mention may be made of polyvinyl alcohols.

Polyvinyl alcohol is a water-white, resin-like material usually obtained by the hydrolysis of polymerized vinyl esters, such as, polyvinyl acetate. Polyvinyl alcohol can be made in a number of modifications of various degrees of polymerization, the degree of polymerization depending largely upon the extent to which the final compound, from which it is made, has been polymerized. All of the modifications are soluble in water to some extent, the more highly polymerized being less easily dissolved and producing solutions of a higher viscosity. A number of so-called partial derivatives of polyvinyl alcohol can be prepared in which some of the hydroxyl groups in the molecule are replaced with other radicals such as, for example, ester radicals. The properties of the partial derivatives of polyvinyl alcohol vary with the proportion of hydroxyl radicals substituted by other groups. When the hydroxyl radicals predominate, the partial derivatives have substantially the properties of polyvinyl alcohol. The term "polyvinyl alcohol" as used herein, therefore, also includes such partial derivatives as contain a sufficient number of unsubstituted hydroxyl groups to make the composition soluble or dispersible in water.

As previously indicated, the water dispersible or water soluble film forming base may consist of a single type of carbohydrate material or a plurality of carbohydrate materials. Especially good results have been obtained with film forming compositions containing both an amylaceous film forming substance and a polyvinyl alcohol. Examples of such compositions have already been given for the purpose of illustration. In such compositions the amylaceous substance preferably comprises the principal film forming ingredient or component with the polyvinyl alcohol present in a minor proportion, which will vary depending upon the particular type of film forming composition and its intended use.

The fixing agents which have been found to be preferable for the purpose of the present invention are antimony compounds capable of converting water dispersible, polyhydroxylated, film forming substances from a hydrophilic to a hydrophobic state. The antimony compounds which have been found to be especially suitable are those in which antimony is present in its pentavalent state. Certain antimony compounds are of less value for the purpose of the present invention, as, for example, antimonous oxide ($Sb_2O_3$) and sodium antimonate. These two compounds are better when freshly precipitated. Tartar emetic has some effect when employed under alkaline conditions. Larger amounts of the trivalent antimony compounds are normally required.

Of the fixing agents, potassium pyroantimonate is of principal importance. It occurs in two modifications, namely, the acid salt ($K_2H_2Sb_2O_7$) and the neutral salt ($K_4Sb_2O_7$). Up to the present time the material which is available commercially is what is called "re-agent material"

which is largely acid salt, although it contains some neutral salt. Antimonic oxide ($Sb_2O_5$) may also be employed as the fixing agent. A product obtained by dissolving antimony metal in excess concentrated nitric acid which was apparently the acid $H_3SbO_4$ also acted as a fixing agent. It was further observed that when potassium pyroantimonate and antimony trifluoride were mixed together or when potassium pyroantimonate and antimony lactate were mixed together, the resultant precipitate could be employed as a fixing agent for the water soluble film forming component of the composition.

In all cases the film forming components found to be suitable for the purpose of the invention have been polyhydroxylated compounds which form colloidal dispersions in water and are capable of forming continuous films. For the most part these materials are carbohydrates or polysaccharides hydrolyzable by acids to simpler molecular compounds.

In practicing the invention it has been found that as previously indicated, the addition of an auxiliary agent, particularly an agent capable of thinning starches, that is, of decreasing their viscosity in aqueous dispersions, may be advantageous in order to prevent jelling or too rapid reaction by the fixing agent on the starch. The same considerations apply to other water dispersible film forming substances which may be employed in accordance with the invention. The addition of the auxiliary agents is especially desirable in finishing compositions. Generally speaking, the auxiliary agent is preferably any compound or salt having a thinning action on the binding agent which has a pH or develops a pH within the range of about 2.5 to about 10.0.

Among the salts or other compounds which may be employed are, for example, sodium silico fluoride, antimony trifluoride, ammonium oxalate, sodium perborate, sodium persulphate, citric acid, lactic acid and acetic acid. Enzymes may also be added to produce a thinning action. Some of these salts such as, for example, antimony trifluoride, have some fixing value of their own when used as auxiliary agents, and it is, therefore, more advantageous to use these as thinning agents. Others, such as ammonium oxalate, are illustrative of salts which become acidic on heating. Other salts, such as sodium perborate and sodium persulphate, derive their thinning action from their oxidizing properties. The free acids, such as citric acid, lactic acid and acetic acid are capable of thinning starches without breaking them down too much.

If the pH is too low, the starch may be broken down so much as to require a relatively large amount of the fixing agent. Likewise, the strongly acidic condition may adversely affect the cloth on which the mix is being applied. If the pH is too high, the desired fixing action either does not occur or is greatly reduced, particularly as to the pentavalent antimony compounds. The latter are more reactive on the acid side while some of the trivalent antimony compounds, such as tartar emetic, seem to have only a relatively small amount of fixing action as compared with the pentavalent antimony compounds and this only on the alkaline side.

Generally speaking, the best results have been obtained by employing pentavalent antimony compounds capable of reacting with carbohydrate materials of the type described under substantialy non-alkaline conditions, that is to say, at a pH not substantially higher than 7.

The proportions and concentrations of the various ingredients of the film forming compositions may vary rather widely depending upon the type of treatment and upon the type of article or material being treated, as well as upon other related factors. In the sizing and finishing of textiles the weight ratio of solids to water in the compositions is preferably within the range of 1% to 15%. In coating papers, on the other hand, the solids content of the composition is preferably higher.

The amount of the composition retained by the article or object being treated will depend largely upon the viscosity of the composition and the method of treatment. Good results in sizing and finishing textiles may be obtained if the amount of sizing or finishing composition on the material is within the range from about 1% to about 15% by weight of the material. Ordinarily the treating bath may be either hot or cold. The flexibility of the material or article being treated is a factor. The film forming compositions of the present invention are characterized by good flexibility of the films formed, but on articles or objects which are rigid or non-flexible it will often be desirable to increase the coatweight over that which would be employed on flexible articles or materials.

The amount of the antimony compound, as, for example, potassium pyroantimonate, is preferably within the range of about 0.25% to about 25%, based upon the weight of the film forming carbohydrate component of the composition, or upon the total weight of a plurality of such components if more than one is used. Thus, with locust bean gum, good results can be obtained with, say, 1% potassium pyroantimonate based on the weight of the gum, while with a highly soluble dextrine, it may be desirable to employ as much as 25% of the potasium pyroantimonate. If the potasium pyroantimonate is applied in a separate phase in the form of a solution, the amount thereof is preferably within the range of about 0.01% to about 2%, based on the total weight of the solution.

In practicing the invention, it is very important to thoroughly dry the article, object or material to which the film forming compositions of the invention have been applied. It has been found that the fastness of the reaction product and its resistance to water are more nearly perfect after complete drying of the object or article treated. As an example, when 10% moisture is left in a piece of fabric that has been starched with a composition containing a starchy material and potassium pyroantimonate, there may be a loss on the first wash test of about 75% of the starch added to the fabric. With 5% moisture left in the fabric, the loss may be around 40% to 50%. Below 2% moisture left in the fabric and down as low as 1%, the loss may be reduced to little or nothing. In connection with the drying of the textile fabrics and fibers containing a binding agent and a fixing agent of the character herein described, as, for example, amylaceous substances and locust bean gum solutions containing potassium pyroantimonate, it is preferable to dry the fabric at a temperature of 180° F. or higher prior to the time that the moisture contained in the treating composition is lost or reduced materially. Otherwise, the fixation, permanency or insolubility of the finish is apparently lessened.

It will be recognized that a wide variety of auxiliary agents may be added to the compositions herein described. Among such addition agents may be mentioned fuller's earth, bentonite, and related substances. The compositions may also contain natural or synthetic resins, as, for example, urea formaldehyde resins, vinyl resins, methyl methacrylate resins and other suitable types of resins such as are normally employed in the treatment of textile materials. The proportions of these materials may also vary depending upon the type of treatment and the material treated. The use of fulling or softening agents in the treating composition such as glycerine, sulfonated oils, higher alcohol sulfates (e. g., dodecyl sulfate or cetyl sulfate) is not always desirable because such agents sometimes decrease the amount of fixation of the binding agent on the cloth or fabric, but they may be applied later.

In preparing the various compositions of the invention, a dry blend of the water dispersible or water soluble film forming base material and the antimony compound may be prepared. This blend is marketed in dry or powdered form and requires only the addition of water and mixing, preferably with heating, to produce the composition in dispersed form. Auxiliary materials, such as those previously mentioned, may also be included in the dry base.

It has already been indicated that the invention has a rather wide scope in its practical application. Although the invention has been illustrated particularly with reference to the treatment of textile fabrics and paper, it will be understood that it may be employed in coating, impregnating and otherwise treating a wide variety of other materials, including woven materials, knit materials, sheet materials, boardlike products, fabricated articles such as boxes, bottles, tubes, and the like, made from cellulose, linen, wool, asbestos, glass, cellulose esters, cellulose, synthetic polyamides (nylon), and other natural and synthetic fibers and articles fabricated therefrom.

The invention may also be practiced by incorporating compositions of the character herein described containing a film forming carbohydrate substance, for example, starch, and a suitable antimony compound, for example, potassium pyroantimonate, into laundry compositions in order to give the laundered product a better finish. The compositions thus prepared may be cooked and used in the same way as starch is being used for laundry purposes now. The heat from the laundering operation, such as ironing, assists the reaction between the binding agent and the fixing agent and produces a more permanent finish.

Having thus described the invention, what we claim as new and desire to secure by Letters Patent of the United States is:

1. A film forming composition comprising a water dispersible film forming carbohydrate material, hydrolyzable by acids to simpler molecular compounds, and a fixing agent comprising an antimony compound reactive with said carbohydrate material to render said carbohydrate material water insoluble upon dehydration, said composition having a pH less than 10.

2. A film forming composition comprising a water dispersible film forming carbohydrate material, hydrolyzable by acids to simpler molecular compounds, and a fixing agent comprising an antimony compound reactive with said carbohydrate material to render said corbohydrate material water insoluble upon dehydration, said composition having a pH not substantially greater than 7.

3. A film forming composition comprising a water dispersible film forming carbohydrate material, hydrolyzable by acids to simpler molecular compounds, and a fixing agent comprising an antimony compound reactive with said carbohydrate material to render said carbohydrate material water insoluble upon dehydration, said composition having a pH less than 7.

4. A film forming composition comprising a water dispersible film forming carbohydrate material, hydrolyzable by acids to simpler molecular compounds, and a fixing agent comprising an antimony compound reactive with said carbohydrate material to render said carbohydrate material water insoluble upon dehydration, said composition having a pH within the range from 2.5 to 10.

5. An amylaceous composition comprising a substantial quantity of a water dispersible, film forming amylaceous substance and a minor proportion of an antimony compound reactive with said amylaceous substance to render said amylaceous substance water insoluble upon dehydration, said composition having a pH less than 10.

6. A composition of matter comprising a water dispersible, predominantly starchy film forming amylaceous substance, hydrolyzable by acids to simpler molecular compounds, and an antimony compound reactive with said amylaceous substance to render said amylaceous substance water insoluble upon dehydration, said composition having a pH within the range from about 2.5 to about 10.

7. A composition of matter comprising a water dispersible, film forming amylaceous substance, hydrolyzable by acids to simpler molecular compounds, a water dispersible polyvinyl alcohol, and an antimony compound reactive with said amylaceous substance and said polyvinyl alcohol to render the same water insoluble upon dehydration.

8. A treating composition for treating various types of articles to render the same water resistant, said composition comprising at least one water dispersible, film forming carbohydrate material, hydrolyzable by acids to simpler molecular compounds, an antimony compound reactive with said carbohydrate material to render the same water insoluble upon dehydration, and a thinning agent for said carbohydrate material.

9. A composition of matter comprising as one component a water dispersible, film forming carbohydrate material, hydrolyzable by acids to simpler molecular compounds, and a water soluble pyroantimonate, said carbohydrate material comprising the major film forming component of said composition, and said water soluble pyroantimonate being present in a minor proportion as compared with the amount of said carbohydrate material, said composition having a pH within the range from 2.5 to 10.

10. A treating composition for treating various types of articles to render the same water resistant, said composition comprising as one component a water dispersible, film forming amylaceous substance, and a pyroantimonate, said amylaceous substance being the major film forming component of said composition, and said pyroantimonate being present in a minor proportion as compared with the amount of said amylaceous substance, said composition having a pH less than 10.

11. An article of manufacture containing a water resistant reaction product of an antimony compound with a water dispersible, film forming carbohydrate material of the type hydrolyzable by acids to simpler molecular compounds.

12. An article of manufacture containing a water resistant reaction product of a pentavalent antimony compound with a film forming carbohydrate material of the type hydrolyzable by acids to simpler molecular compounds.

13. An article of manufacture containing a water resistant reaction product of an antimony compound with a film forming amylaceous substance.

14. An article of manufacture containing a water resistant reaction product of a water soluble pyroantimonate with a water dispersible, film forming carbohydrate material of the type hydrolyzable by acids to simpler molecular compounds.

15. An article of manufacture containing a water resistant reaction product of a water soluble pyroantimonate with at least one water dispersible, film forming carbohydrate material of the type hydrolyzable by acids to simpler molecular compounds, a major proportion of said film forming carbohydrate material comprising an amylaceous substance.

16. A flexible sheet material coated with a flexible water insoluble film comprising the dehydrated reaction product of the reaction between a pentavalent antimony compound and at least one water dispersible, film forming carbohydrate material of the type hydrolyzable by acids to simpler molecular compounds, a starchy carbohydrate comprising the major proportion of said film.

17. A fibrous material impregnated with the water resistant reaction product obtainable by dehydration on the fibers of said material of a water soluble pyroantimonate and a water dispersible, film forming carbohydrate material of the type hydrolyzable by acids to simpler molecular compounds, said carbohydrate material comprising a substantial amount of a starchy substance and said water soluble pyroantimonate being present in a minor proportion as compared with the amount of said starchy substance.

18. An article of manufacture containing a water resistant reaction product of an antimony compound with a polyvinyl alcohol.

19. An article of manufacture containing a water resistant reaction product of an antimony compound with a polyvinyl alcohol and an amylaceous substance.

20. An article of manufacture containing a water resistant reaction product of an antimony compound with a water dispersible, film forming carbohydrate material of the type hydrolyzable by acids to simpler molecular compounds, said carbohydrate material comprising a natural gum.

21. The method of treating various types of articles to render the same more resistant to water which comprises applying to an article to be treated at least one water dispersible, film forming carbohydrate material of the type hydrolyzable by acids to simpler molecular compounds, and an antimony compound reactive with said carbohydrate material to render the same water insoluble upon dehydration, and dehydrating said carbohydrate material in the presence of said antimony compound at a pH less than 10.

22. The method of treating various types of articles to render the same more resistant to water which comprises applying to an article to be treated at least one water dispersible, film forming carbohydrate material of the type hydrolyzable by acids to simpler molecular compounds, and an antimony compound reactive with said carbohydrate material to render the same water insoluble upon dehydration, and dehydrating said carbohydrate material in the presence of said antimony compound to a moisture content less than about 3%.

23. A method for treating various types of articles to render the same water resistant which comprises applying to the articles to be treated a coating of an intimate dispersion of a film forming carhohydrate material of the type hydrolyzable by acids to simpler molecular compounds, and an antimony compound reactive with said carhohydrate material to render the same water insoluble, and drying said coating to a moisture content below 10%.

24. In a method of treating various types of articles to render the same water resistant, the steps which comprise applying to said articles at least one water dispersible, film forming carbohydrate material of the type hydrolyzable by acids to simpler molecular compounds, and an antimony compound reactive with said carbohydrate material upon dehydration to render the same water insoluble, and drying said carbohydrate material in the presence of said antimony compound at a temperature above about 180° F.

25. In the art of treating various types of articles to render the same water resistant, the steps which comprise applying to said articles at least one water dispersible, film forming carbohydrate material of the type hydrolyzable by acids to simpler molecular compounds, and an antimony compound reactive with said carbohydrate material to render the same water insoluble upon dehydration, and dehydrating said carbohydrate material in the presence of said antimony compound at a pH within the range of about 2.5 to about 10.

26. A method of treating objects to render them more water resistant which comprises applying thereto a water dispersible, film forming carbohydrate material hydrolyzable by acids to a simpler molecular form, applying to said object in a separate phase an antimony compound reactive with said carbohydrate material to render the same water insoluble and then drying the object containing said carbohydrate material and said antimony compound.

27. A method of treating objects to impart increased resistance to water which comprises applying to said objects a coating of a dispersion in water of a water dispersible, film forming carbohydrate substance of the type hydrolyzable by acids to a simpler molecular form, and a water soluble pyroantimonate, and then drying said coating to a moisture content less than 10% by weight of the coating.

28. A method of treating objects in order to impart water resistance thereto which comprises applying to said objects an aqueous dispersion of a water dispersible, film forming carbohydrate substance of the type hydrolyzable by acids to a simpler molecular form, and an antimony compound reactive with said carbohydrate substance to render said carbohydrate substance water insoluble upon dehydration, the amount of antimony compound corresponding to about 0.25% to about 25% by weight of the carbohydrate substance, said dispersion having a pH less than 10, and then drying the dispersed carbohydrate substance and antimony compound to a moisture content less than about 5%.

29. A method of treating articles to impart a substantially permanent finish thereto which comprises applying to said articles in the presence of moisture a water dispersed amylaceous substance and potassium pyroantimonate, the amount of potassium pyroantimonate corresponding to about 0.25% to about 25% by weight of the amylaceous substance, and then removing the moisture until the moisture content is less than 5%.

30. In a method of treating articles containing a water dispersible, film forming carbohydrate material of the type hydrolyzable by acids to simpler molecular compounds, the step which comprises treating said articles with an aqueous solution containing about 0.1% to about 2% by weight of potassium pyroantimonate, and then drying.

31. An article of manufacture comprising a coaction product of a water dispersed film forming carbohydrate material of the type hydrolyzable by acids to simpler molecular compounds and an antimony compound selected from the group consisting of the oxides, antimonates and free acids in which the antimony exists in the pentavalent state, dried together while in association with said article to a state of water insolubility.

32. An article of manufacture containing a coaction product of an amylaceous material and an antimonate dried together to a state of water insolubility.

33. An article of manufacture containing a water insoluble coaction product of an amylaceous material and a pentavalent antimony oxide dried together to a state of water insolubility.

34. The method of treating various types of articles and materials which comprises applying thereto at least one water dispersed film forming carbohydrate material of the type hydrolyzable by acids to simpler molecular compounds, and an antimony compound selected from the group consisting of oxides, antimonates and acids in which the antimony is present in the pentavalent state, and drying said carbohydrate material in the presence of said antimony compound at a pH sufficiently low to convert said film forming carbohydrate to a hydrophobic state.

35. A method of treating objects and materials to render them more resistant to washing which comprises applying thereto a water dispersed, film forming amylaceous substance and an antimonate, and drying said material, said treatment being carried out at a pH within the range from 2.5 to 10.

36. A method of treating objects and materials to render them more resistant to washing which comprises applying thereto a water dispersed, film forming amylaceous substance and an oxide of antimony in which the antimony is present in the pentavalent state, and then drying the object at a pH within the range of 2.5 to 10.

37. A method of treating objects and materials to render them more resistant to washing which comprises applying thereto a water dispersed, film forming amylaceous substance and a free acid of antimony in which the antimony is present in the pentavalent state, and then drying the object at a pH within the range of 2.5 to 10.

IRA L. GRIFFIN.
DAVE E. TRUAX.
NORMAN H. NUTTALL.